(12) United States Patent
Fujikawa et al.

(10) Patent No.: US 8,196,560 B2
(45) Date of Patent: Jun. 12, 2012

(54) INTERNAL COMBUSTION ENGINE OF SPARK-IGNITION DIRECT-INJECTION TYPE AND FUEL INJECTING METHOD THEREOF

(75) Inventors: Tatsuya Fujikawa, Hiroshima (JP);
Toshiaki Nishimoto, Hiroshima (JP);
Masahisa Yamakawa, Hiroshima (JP);
Kouji Shishime, Hiroshima (JP);
Kiyotaka Sato, Hiroshima (JP)

(73) Assignee: Mazda Motor Corporation (JP)

( * ) Notice: Subject to any disclaimer, the term of this patent is extended or adjusted under 35 U.S.C. 154(b) by 714 days.

(21) Appl. No.: 12/410,076

(22) Filed: Mar. 24, 2009

(65) Prior Publication Data

US 2009/0235897 A1    Sep. 24, 2009

(30) Foreign Application Priority Data

Mar. 24, 2008   (JP) ................... 2008-075928

(51) Int. Cl.
*F02M 61/14* (2006.01)
*F02B 5/00* (2006.01)
*F02B 17/00* (2006.01)
(52) U.S. Cl. ........................................ 123/305
(58) Field of Classification Search .............. 123/305, 123/295, 298, 302, 306, 308
See application file for complete search history.

(56) References Cited

U.S. PATENT DOCUMENTS

| 5,720,253 A * | 2/1998 | Matoba et al. ................. 123/298 |
| 6,006,719 A * | 12/1999 | Matsumura ................... 123/302 |
| 6,705,275 B2 * | 3/2004 | Fukuzumi ..................... 123/295 |

FOREIGN PATENT DOCUMENTS

| DE | 102004002296 A1 | 8/2005 |
| JP | 2004028078 A | 1/2004 |
| JP | 2004245204 A | 9/2004 |
| JP | 2007-170206 A | 7/2007 |
| JP | 2007192163 A | 8/2007 |
| JP | 2008057479 A | 3/2008 |

OTHER PUBLICATIONS

P. Wolters et al; "Die nachste Generation von Otto-DI Brennverfahren (The Next Generation of Gasoline Direct Injection Engine Technology)" from Aachener Kolloquium Fahrzeug-und Motorentechnik 2001; Jan. 1, 2001; pp. 773-789; with English Summary.

European Search Report dated Jul. 21, 2009; Application No. 09004213.6-1263.

* cited by examiner

*Primary Examiner* — Hieu T Vo
(74) *Attorney, Agent, or Firm* — Studebaker & Brackett PC; Donald R. Studebaker (57) ABSTRACT

A multi-hole injector directly injects fuel into a combustion chamber. Intake air is introduced into the combustion chamber through intake ports to provide tumble flow in the combustion chamber. A cavity is formed in a part of the top surface of a piston which is eccentric to the exhaust side. In the intake stroke, fuel injection ends in a downstroke of a piston. When the crank angle is 100 degrees after the top dead center in the intake stroke at which the fuel injection ends, a most downward lower spray collides with a part of the top surface of the piston which ranges on the intake side from the edge on the exhaust side of the cavity. A most upward upper spray does not come into contact with a spark plug. Thus, the fuel injection can enhance the tumble flow to promote homogeneous dispersion of fuel-air mixture in the combustion chamber.

9 Claims, 8 Drawing Sheets

INTERNAL COMBUSTION ENGINE OF SPARK-IGNITION DIRECT-INJECTION TYPE AND FUEL INJECTING METHOD THEREOF

CROSS REFERENCE TO RELATED APPLICATIONS

This application claims priority under 35 U.S.C. §119(a) on Patent Application No. 2008-075928 filed in Japan on Mar. 24, 2008, the entire contents of which are hereby incorporated by reference.

TECHNICAL FIELD

The present disclosure relates to internal combustion engines of spark-ignition direct-injection type in which fuel injection valves having multiple injection ports are arranged so as to directly inject fuel into a combustion chamber, and fuel injecting methods thereof, and particularly relates to a technique for increasing homogeneity of fuel-air mixture.

BACKGROUND ART

Conventionally, a spark ignition internal combustion engine (or a direct injection engine) directly injecting fuel into a combustion chamber may include multi-port fuel injection valves having a plurality of injection ports, which may be called multi-hole injector.

For example, Patent Document 1 discloses a direct injection engine including a multi-hole injector in the upper part on the intake side of the combustion chamber. This multi-hole injector injects part of the fuel toward a cavity formed in the top surface of a piston to guide the part of the fuel to the vicinity of the spark plug via the cavity, thereby implementing stratified charge combustion.

Such a cavity has a large space from the central part of the top surface of the piston to the intake side, and the part of the fuel is injected toward a part on the intake side of the cavity. In such stratified charge combustion, fuel injection is performed generally during the compression stroke for implementing stable stratified charge combustion.

Besides the stratified charge combustion, homogeneous charge combustion, which is combustion by homogeneously dispersing the fuel-air mixture in the entire combustion chamber, may be performed.

In this case, in general, the fuel is injected during the intake stroke for introducing the intake air to the combustion chamber to provide and homogeneously distribute the fuel-air mixture in the entire combustion chamber by utilizing the flow of intake air generated in that time in the combustion chamber. Particularly, comparatively strong intake air flow whirling vertically from the intake side toward the exhaust side, which may called tumble flow, is utilized effectively.

Patent Document 1: Japanese Unexamined Patent Application Publication 2007-170206

SUMMARY

Problems that the Invention is to Solve

The multi-hole injector of Patent Document 1 injects the fuel toward the cavity of the piston, and is accordingly advantages in reducing fuel adhesion to the wall surface of the cylinder and in preventing combustion failure and the like.

However, since the fuel injection is oriented approximately vertically downward, when the fuel is injected in the intake stroke for the homogeneous charge combustion, the injected fuel may collide with the tumble flow, resulting in reduction in speed of the tumble flow, thereby decreasing efficiency of homogeneous dispersion of the fuel-air mixture.

The present invention has been made in view of the foregoing, and its objective is to promote homogeneous dispersion of the fuel-air mixture in the combustion chamber by enhancing the tumble flow by fuel injection.

Means for Solving the Problems

To attain the above objective, the present invention sets the direction of fuel injection so as to enhance the tumble flow.

Specifically, in an internal combustion engine of spark-ignition direct-injection type in which a fuel injection valve having a tip end part with a plurality of injection ports is configured to directly inject fuel into a combustion chamber in a cylinder, the combustion chamber includes an upper surface defined by a ceiling wall formed in a cylinder head, and a lower surface defined by a top surface of a piston, two intake ports opened/closed by intake valves are formed in the ceiling wall for introducing intake air into the combustion chamber to provide intake flow flowing from an intake side toward an exhaust side in an upper part of the combustion chamber, the two intake ports are arranged adjacent to each other in a peripheral part of the ceiling wall, and the injection valves between the intake ports have tip ends facing the combustion chamber, a cavity is formed in a part of the top surface of the piston below a spark plug, and when a crank angle is 100 degrees after the top dead center in an intake strode, a lower spray, which is a spray from a lower injection port injecting the fuel the most downward of the plurality of injection ports, collides with a part of the top surface of the piston which ranges on the intake side from an edge on the exhaust side of the cavity.

In the above arrangement, the two intake ports opened/closed by the intake valves are formed in the ceiling wall of the combustion chamber. The intake air introduced into the combustion chamber through the intake ports flows in the upper part of the combustion chamber from the intake side toward the exhaust side first, flows downward on the exhaust side, flows toward the intake side along the top surface of the piston, and then flows upward on the intake side, thereby circulating largely in the vertical direction in the entire combustion chamber.

In other words, vertically whirling flow, which flows downward on the exhaust side while flowing upward on the intake side and is so-called tumble flow, is provided in the combustion chamber during the intake stroke.

Each tip end part of the fuel injection valves having the plurality of injection ports faces the inside of the combustion chamber at the peripheral part of the ceiling wall on the intake side, and a cavity is formed in a part of the top surface of the piston which is eccentric toward the exhaust side.

Accordingly, when the fuel is injected toward the cavity, a spray is formed not therebelow, but toward the exhaust side from the intake side in the combustion chamber so as to extend obliquely downward. Hence, the fuel droplets are moved comparatively largely in the combustion chamber to be readily dispersed before they collide with the cavity.

When the crank angle after the top dead center in the intake strode is 100 degrees, the lower spray from the lower injection port collides with a part of the top surface of the piston which ranges on the intake side from the edge on the exhaust side of the cavity.

When the crank angle after the top dead center in the intake strode is 100 degrees, the piston is in its downstroke, and the top surface of the piston is located comparatively low in the cylinder. Under this positional relationship, the most downwardly oriented lower spray of the plurality of sprays collides with a part of the top surface of the piston which ranges on the intake side from the edge on the exhaust side of the cavity.

This causes the fuel injected from the lower injection port to collides with and rebound from the top surface of the piston including the cavity, with a result that less amount of fuel may adhere to the peripheral wall of the cylinder to prevent combustion failure and the like.

Further, the lower spray will not collide head-on with the upward tumble flow on the intake side, thereby preventing impairment of the tumble flow caused by the fuel injection. The spray from the intake side toward the exhaust side convolves the intake air flow flowing upward on the intake side of the combustion chamber to promote circulation of the tumble flow, thereby promoting homogeneous dispersion of the fuel-air mixture.

When the crank angle in the intake strode is the above angle, preferably, the lower spray collides with a part of the top surface of the piston which ranges on the exhaust side from an edge on the intake side of the cavity. With this arrangement, further less amount of fuel can adhere to the peripheral wall of the cylinder, thereby further promoting homogeneous dispersion of the fuel-air mixture.

The cavity may be eccentric to the exhaust side from a substantial center of the piston, and may include an inclined surface at at least part of a peripheral surface thereof. With this arrangement, the fuel droplets colliding with the inclined surface rebound toward the central part of the combustion chamber. This can further ensure reduction in fuel adhesion to the peripheral wall, and can reduce local distribution of rich fuel-air mixture on the exhaust side.

Preferably, the lower spray has a center line intersected with an axial line of the cylinder, and other sprays above and adjacent to the lower spray have center lines passing on respective sides of the axial line of the cylinder. This allows close orientation of the plurality of fuel sprays with no interference with each other involved in a comparatively narrow combustion chamber.

Particularly, in the case where the spark plug is arranged at the substantial center of the ceiling wall of the combustion chamber, an upper spray, which is a spray from an upper injection port injecting the fuel the most upward of the plurality of injection ports, does not come into contact with the spark plug. This can prevent the fuel droplets from adhering to the electrode of the spark plug, thereby preventing soot by fuel combustion.

Specifically, the upper spray from the upper injection port has a center line extending downward below a plane which passes through the upper injection port and which is perpendicular to the axial line of the cylinder. With this arrangement, the upper spray from the upper injection port can also enhance the tumble flow to promote homogeneous dispersion of the fuel-air mixture. In combination with spray convolving operation by the lower injection port, the tumble flow can circulate further smoothly.

In addition, it is preferable that the plurality of injection ports are configured so that sprays injected therefrom do not collide with each other. With this arrangement, the fuel droplets injected from different injection ports are prevented from colliding with each other, and from being integrated and being large. This can avoid difficulty in gasification of the fuel droplets.

Another aspect of the present invention provides a fuel injection method.

Namely, a fuel injecting method for directly injecting fuel in plural directions into a combustion chamber of a spark ignition internal combustion engine, includes: injecting the fuel into the combustion chamber from a part between two adjacent intake ports, which are formed in a peripheral part of a ceiling wall of the combustion chamber, in an intake stroke for introducing intake air to the combustion chamber from the intake ports to cause intake air to flow from an intake side toward an exhaust side in the upper part of the combustion chamber, wherein in the injecting, at an end of fuel injection when fuel injection ends in a downstroke of a piston, a most downward lower spray collides with a part of the top surface of the piston which ranges on the intake side from the edge on the exhaust side of a cavity, the cavity being formed eccentrically to the exhaust side from the substantial center of the top surface of the piston.

In the above method, so-called tumble flow is provided during the intake stroke. In the injecting in which the fuel is injected during the intake stroke, the most downwardly oriented lower spray collides with the cavity and a part of the piston which ranges on the intake side from the edge on the exhaust side of the cavity at the end of the fuel injection in the downstroke of the piston.

Hence, the fuel in the lower spray always collides with the top surface of the piston including the cavity during injection, thereby reducing fuel adhesion to the peripheral wall of the cylinder.

Furthermore, since the lower spray will not collide head-on with the tumble flow, thereby preventing the tumble flow from being impaired by the fuel injection. The fuel flow by the injection convolves the tumble flow to guide the circulation of the tumble flow, thereby promoting homogeneous dispersion of the fuel-air mixture.

The term, "the end of the fuel injection" here is not a single value in terms of the crank angle, and includes the time point when the piston is located immediately before the bottom dead center in its downstroke.

In addition, it is preferable that in the injecting, the lower spray collides with a part of the top surface of the piston which ranges on the exhaust side from the edge on the intake side of the cavity at an end of the fuel injection. With this arrangement, almost all part of the lower spray can collide with the cavity to further promote homogeneous dispersion of the fuel-air mixture.

ADVANTAGES

As described above, the present invention can enhance the tumble flow by fuel injection. Accordingly, homogeneous dispersion of the fuel-air mixture in the combustion chamber can be promoted, thereby improving fuel economy and output performance and reducing combustion failure and the like.

BRIEF DESCRIPTION OF THE DRAWINGS

FIG. 5 explains the state of fuel injection, in which

BEST MODE FOR CARRYING OUT THE INVENTION

Example embodiments of the present invention will be described below with reference to the accompanying drawings. The following preferred example embodiments are substantially mere examples, and are not intended to limit the scope of the present invention, applicable subjects, and uses.

—Overall Configuration—

Figure 1:
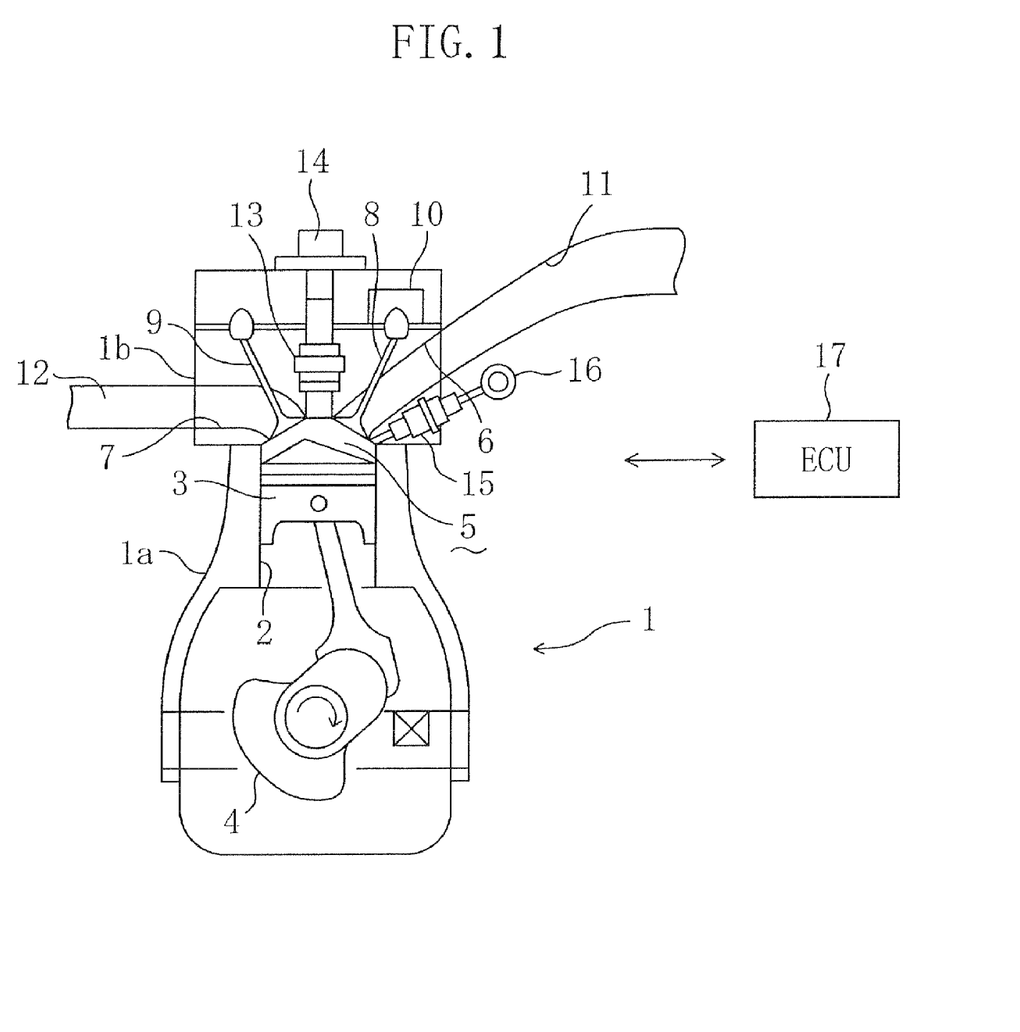
FIG. 1 is a schematic view of an internal combustion engine of spark-ignition direct-injection type in accordance with the present invention.

FIG. 1 is a schematic view of a direct injection engine 1 in accordance with the present embodiment. The direct injection engine 1 includes a cylinder block 1a and a cylinder head 1b arranged on the cylinder block 1a. Inside the cylinder block 1a and the cylinder head 1b, four cylinders 2 are arranged, and pistons 3 are inserted in the cylinders 2 for vertical reciprocal motion. The pistons 3 are connected to a crank shaft 4 rotatably supported at the lower part of the cylinder block 1a through a connecting rod, and are arranged in series in the direction that the crank shaft 4 extends (only one cylinder 2 is shown in FIG. 1).

Figure 2:
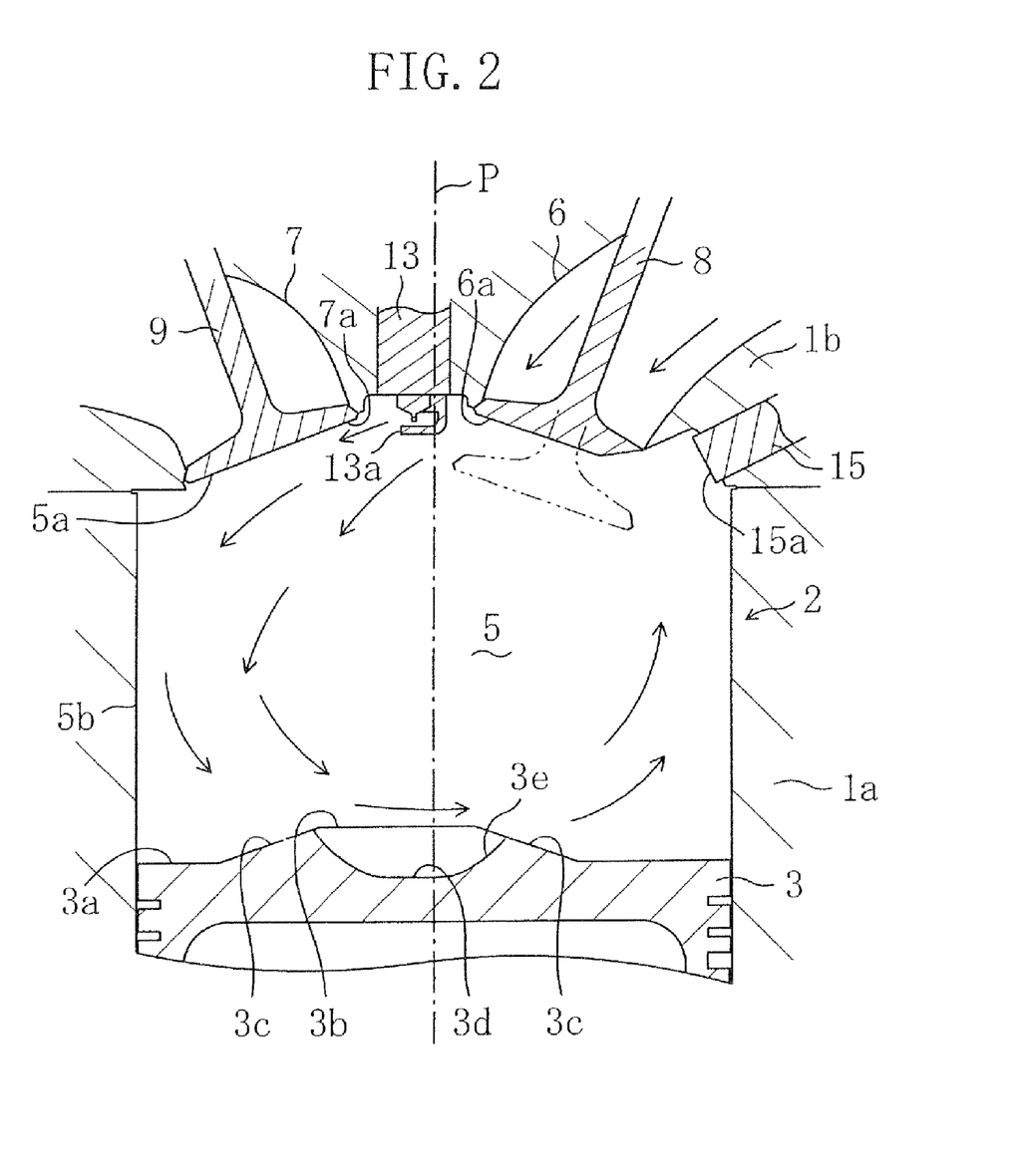
FIG. 2 is a vertical cross-sectional view schematically showing a combustion chamber 5.

As indicated in detail in FIG. 2, a combustion chamber 5 is formed in the upper parts of the cylinders 2. The upper surface of the combustion chamber 5 is defined by a ceiling wall 5a formed at the cylinder head 1b. The side surface thereof is defined by a peripheral wall 5b ranging from the cylinder head 1b to the cylinder block 1a. The lower surface thereof is defined by the top surface 3a of each piston 3. The ceiling wall 5a of the combustion chamber 5 is in a triangular shape including two inclined surfaces, in other words, is in a so-called pent roof shape.

In the cylinder head 1b, there are formed for each cylinder 2 two intake ports 6 for introducing intake air to the combustion chamber 5, and two exhaust ports 7 for discharging burnt gas from the combustion chamber 5.

The two intake ports 6 open side by side in one of the inclined surfaces of the ceiling wall 5a of each cylinder 2, and include at the respective one ends thereof intake inlets 6a opening at the combustion chamber 5. On the other hand, the other ends thereof extend obliquely upward from the combustion chamber 5, and independently open in one side surface (the right side surface in FIG. 1) of the cylinder head 1b. Intake valves 8 opening/closing at a predetermined timing are provided at the intake inlets 6a of the intake ports 6.

The two exhaust ports 7 open side by side in the other inclined surface of the ceiling wall 5a of each cylinder 2, and include at the respective one ends thereof exhaust outlets 7a opening at the combustion chamber 5. On the other hand, the other ends thereof once merge into one in the middle, and the merged one extends substantially horizontally, and then opens at the other end surface (the left side surface in FIG. 1) of the cylinder head 1b. Exhaust valves 9 opening/closing at a predetermined timing are provided at the exhaust outlets 7a of the exhaust ports 7.

The direct injection engine 1 includes a known variable valve timing mechanism 10, which may be referred to as VVT 10, for continuously changing the phase of the cam shaft on the side of the intake valve 8 relative to the crank shaft 4 within a predetermined angle range, so that the opening/closing timing of the intake valves 8 is controlled by the VVT 10 (shown only in FIG. 1).

To the side surface on the intake side of the cylinder head 1b, an intake passage 11 is connected which communicates with the intake ports 6 of the cylinders 2, so that the intake air is supplied to the combustion chamber 5 through the intake passage 11. On the other hand, an exhaust manifold 12 branching to each cylinder 2 and communicating with the exhaust ports 7 is connected to the side surface on the exhaust side of the cylinder head 1b, so that burnt gas (exhaust gas) is discharged from the combustion chamber 5.

During the intake stroke of the combustion cycle, the intake valves 8 at the intake inlets 6a project into the combustion chamber 5 to open the intake inlets 6a, as indicated by an imaginary line in FIG. 2, thereby introducing the intake air into the combustion chamber 5 from the intake ports 6. In this time, comparatively strong intake flow from the intake side toward the exhaust side is provided in the upper part of the combustion chamber 5 to cause intake air flow (tumble flow) vertically whirling in the combustion chamber 5, as indicated in the arrows in the figure.

Specifically, the intake air introduced in the combustion chamber 5 flows into the combustion chamber 5 dominantly from parts of the intake inlets 6a which are located near the center of the ceiling wall 5a, and flows in the upper part of the combustion chamber 5 from the intake side toward the exhaust side. Then, after flowing downward along the peripheral wall 5b on the exhaust side, the intake air flows in the lower part of the combustion chamber 5 from the exhaust side toward the intake side along the top surfaces 3a of the pistons 3. Subsequently, it flows upward along the peripheral wall 5b on the intake side, thereby circulating largely in the vertical direction in the entire combustion chamber 5.

By utilizing this tumble flow, the fuel is dispersed homogeneously to form homogenous fuel-air mixture in the entire combustion chamber 5, into which the fuel is injected in the intake stroke of the cylinders. Fuel injection will be described later in detail.

In the upper part of the combustion chamber 5 in the cylinder head 1b, spark plugs 13 extend along the axial lines P of the cylinders 2. The spark plugs 13 are provided with, at its tip end parts 13a, electrodes projecting downward by a predetermined length into the combustion chamber 5 from the substantial centers of parts of the ceiling wall 5a which are surrounded by two intake ports 6 and two exhaust ports 7. On the other hand, ignition circuits 14 (shown only in FIG. 1) are connected to the base ends of the spark plugs 13 for electrically conducting the spark plugs 13 at a predetermined timing for the respective cylinders 2.

Multi-hole injectors 15 extending below between adjacent two intake ports 6 are provided at the side part on the intake side of the cylinder head 1b. The tip end parts 15a of the multi-hole injectors 15 face the combustion chamber 5 between adjacent two intake inlets 6a in the peripheral parts of the ceiling wall 5a of the cylinder head 1b. The base ends thereof are connected to a fuel distribution pipe 16 (shown only in FIG. 1) common to the cylinders 2.

The fuel distribution pipe 16 is connected to a fuel supply system including a high-pressure fuel pump (not shown) and a high pressure regulator (not shown), so that high pressure fuel sucked from the fuel tank and adjusted at an appropriate pressure is distributed and supplied to the cylinders 2 from the fuel supply system, thereby being injected from the multi-hole injectors 15 of the cylinders 2 in the intake stroke (a fuel injecting step).

An engine control unit (ECU) 17 controls fuel injection timing and injection pressure of the multi-hole injectors 15, ignition timing of the spark plugs 13, opening/closing timing of the intake valves 8 and the exhaust valves 9.

Figure 3:
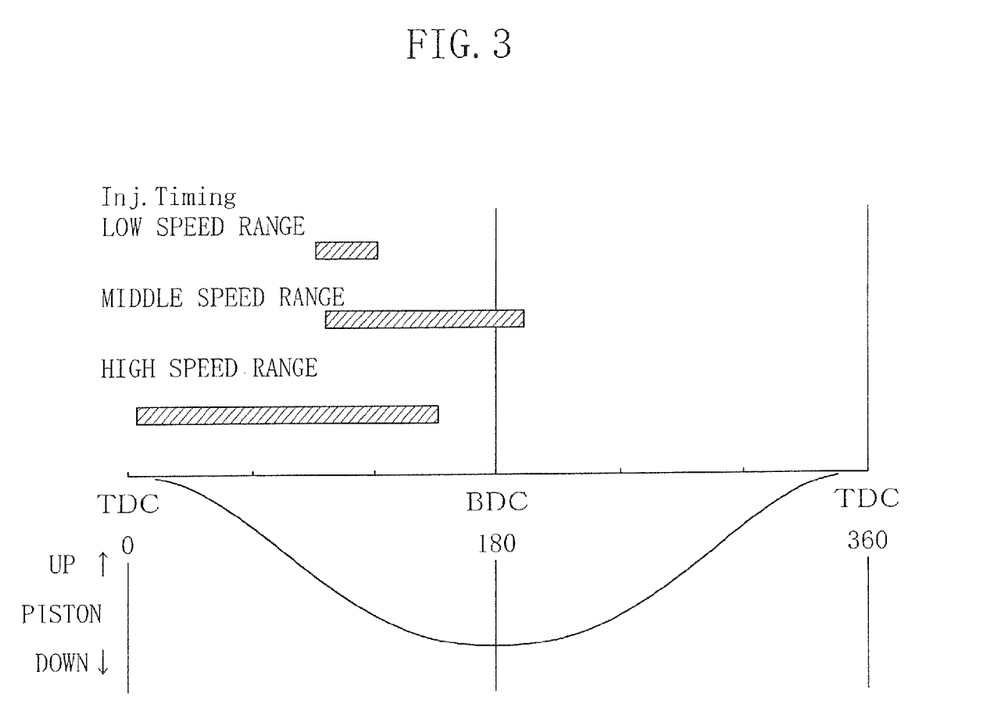
FIG. 3 is a graph for explaining fuel injection timing.

FIG. 3 shows the relationship between the fuel injection timing among the above timings and the position of the pistons 3 in the cylinders 2. In FIG. 3, the horizontal axis indicates the crank angle. The right end indicates the top dead center (TDC) in the compression stroke. The center indicates the bottom dead center (BDC) in the intake stroke. The left end indicates the top dead center (TDC) in the intake stroke. The crank angle is defined with reference to the top dead center (0 degree) in the intake stroke (ATDC). For example, the top dead center in the compression stroke means a crank angle of 360 degrees after the top end center in the intake strode.

The curve in the lower part of FIG. 3 indicates the position of a piston 3 in a cylinder 2, while the strip ranges in the upper part thereof indicate fuel injection durations in the respective engine speed ranges.

As shown in FIG. 3, the fuel injection durations in terms of the crank angle is comparatively short in the low load low rotation range (e.g., 1500 rpm), and becomes longer as the speed increases in the middle rotation range (e.g., 4000 rpm) and in the high rotation range (e.g., 6000 rpm). The fuel injection timing (injection start and injection end) is controlled by the ECU 17 to be different from each other according to the rotation ranges. In the present example embodiment, the crank angle at the end of fuel injection in the low speed range is 100 degrees after the top dead center in the intake stroke.

—Main Configuration—

Fuel injection by the multi-hole injectors 15 will be described next in detail.

Figure 4:
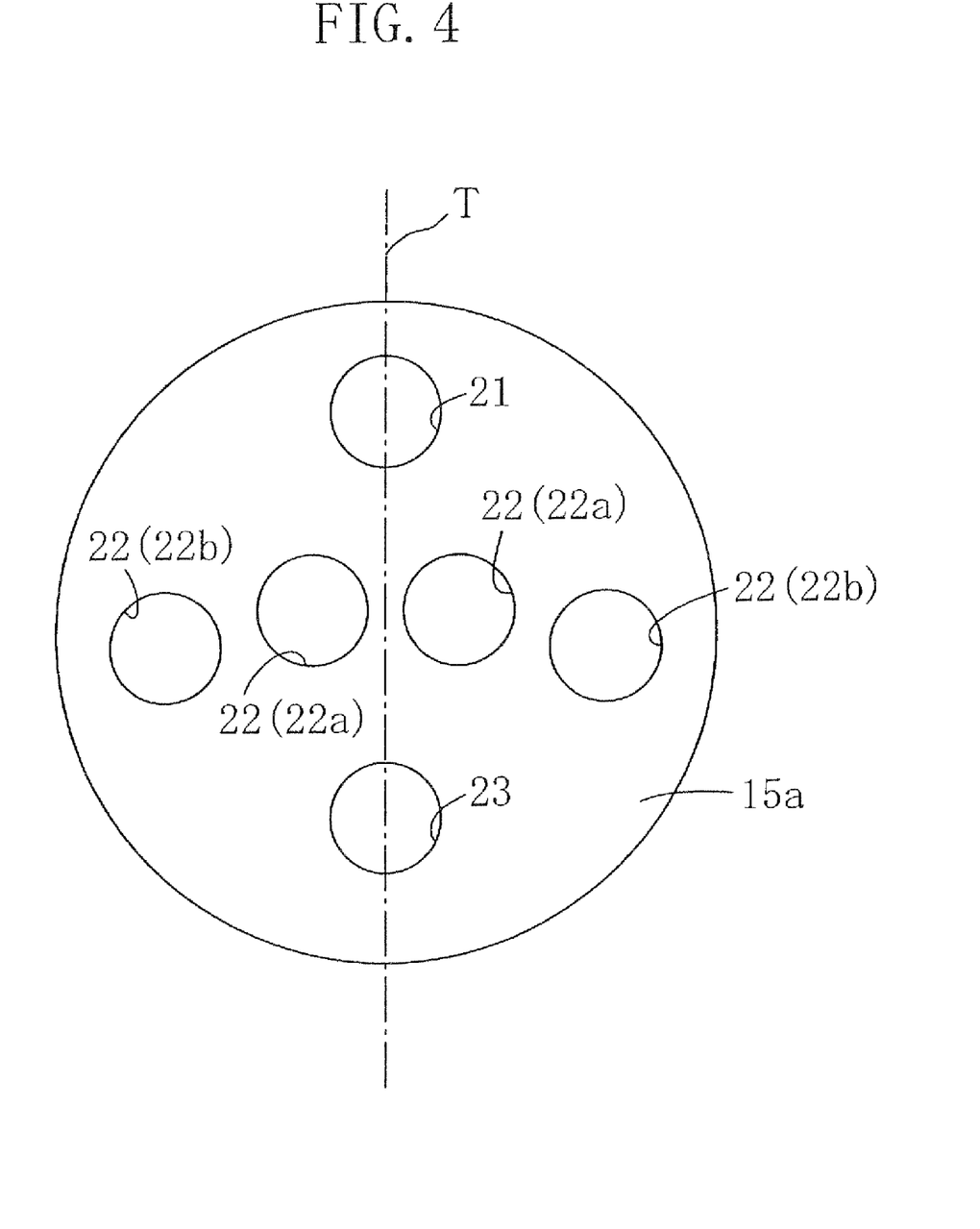
FIG. 4 is a diagram showing the tip end part of a multi-hole injector.
Figure 5A:
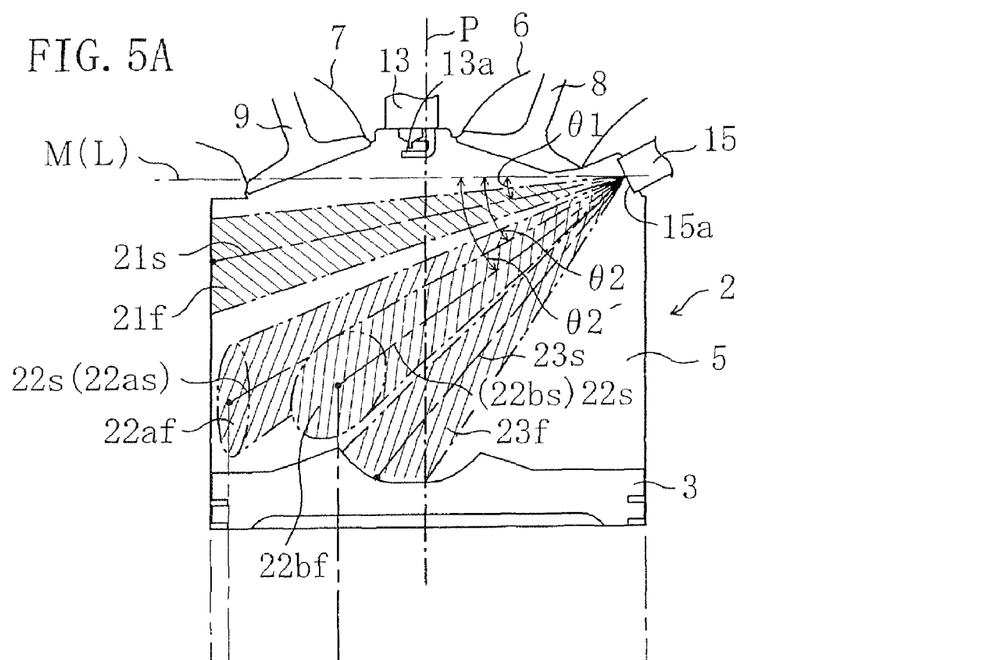
FIG. 5A is a side view.

As shown in FIG. 4, the tip end part 15a of a multi-hole injector 5 has a plurality of injection ports 21, 22, 23 (six in the present example embodiment) for conically spraying the fuel. The injection ports 21, 22, 23 are configured to inject the fuel dominantly in the space on the exhaust side of the combustion chamber 5, as shown in FIG. 5A.

Specifically, one injection port (an upper injection port) 21 located in the upper part of the tip end part 15a of the multi-hole injector 15 is configured to inject the fuel the most upward among all the injection ports 21, 22, 23. Injection ports (middle injection ports, four in the present example embodiment) 22 arranged substantially in the horizontal direction below the upper injection port 21 are configured to inject the fuel more downward by a predetermined angle than the upper injection port 21, specifically, to orient toward the exhaust side of the peripheral wall 5b.

One injection port (a lower injection port) 23 below the middle injection ports 22, is configured to inject the fuel the most downward among all the injection ports 21, 22, 23.

The upper injection port 21 and the lower injection port 23 are arranged on the vertical axis T passing through the center of the tip end part 15a of the multi-hole injector 15, while the middle injection ports 22 are arranged symmetrically with respect to the vertical axis T.

Figure 5B:
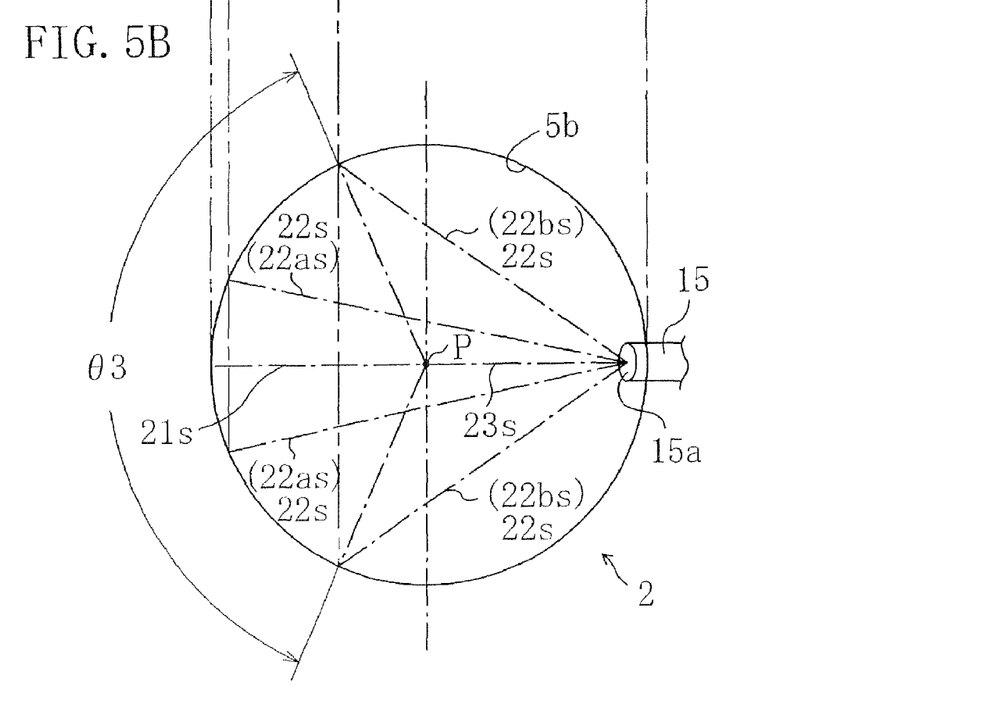
FIG. 5B is a top view.

A spray 21f formed by fuel injection from the upper injection port 21, which may referred to as an upper splay 21f, and a spray 23f formed by fuel injection from the lower injection port 23, which may referred to as a lower splay 23f, respectively have center lines 21s, 23s intersected with the axial line P of the cylinder 2, as shown in FIG. 5B. On the other hand, the center lines 22s of sprays 22f formed by fuel injection from the middle injection ports 22, which may referred to as side splays 22f, extend right and left between the upper spray 21f and the lower spray 23f.

The direction of the injected upper spray 21f is set so as not to come into contact with the tip end part 13a of the spark plug 13, specifically, so that the center line 21s of the upper spray 21f extends downward below the plane M, which passes through the upper injection port 21 and is perpendicular to the axial line P of the cylinder 2, in other words, so as to extend downward from the upper injection port 21, as shown in FIG. 5A. More specifically, the injection angle Θ1 between a line L, which passes through the upper injection port 21 and is perpendicular to the axial line P of the cylinder 2, and the center line 21s of the upper spray 21f is in the range between 10 degrees and 14 degrees as viewed in the direction intersected at a right angle with the center line 21s and the axial line P of the cylinder 2.

Accordingly, less amount of fuel droplets injected from the multi-hole injector 15 may adhere to the electrode of the spark plug to avoid soot. Further, the orientation of the upper spray 21f agrees with that of the tumble flow of the intake air to enhance the tumble flow, thereby promoting homogeneous dispersion of the fuel-air mixture.

Referring next to the middle injection ports 22, they are distributed and arranged efficiently for enhancing the tumble flow.

Figure 6:
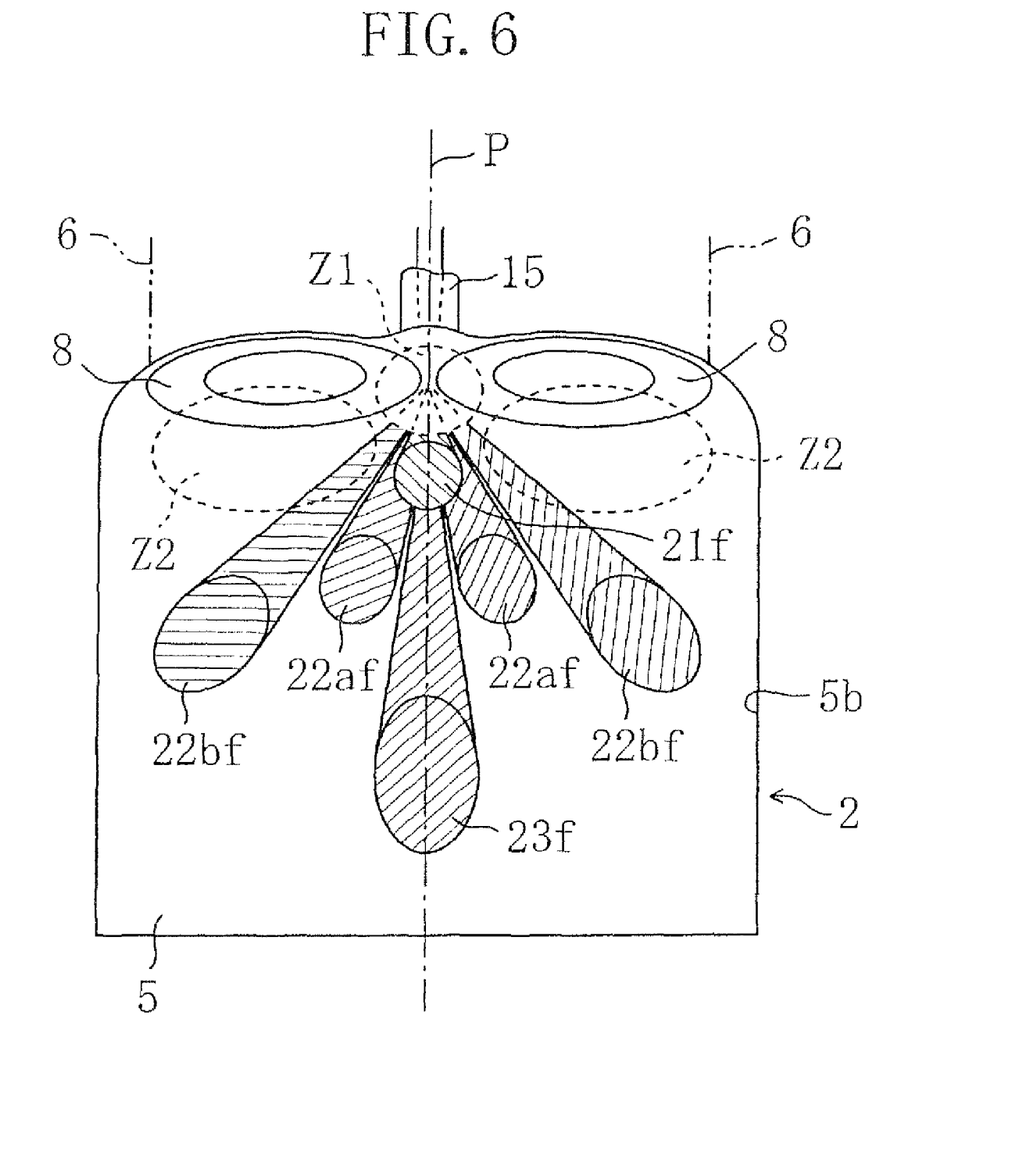
FIG. 6 is an illustration for explaining the state of fuel injection as viewed from an exhaust side.

Two middle injection ports 22 located below the upper injection port 21, which may referred to as inside injection ports 22a, form side sprays 22f, which may referred to as inside sprays 22af. As shown in FIG. 6, the inside injection ports 22a are arranged close to the upper and lower injection ports 21, 23 so that the inside sprays 21af will not collide with the adjacent upper spray 21f and the lower spray 23f in the space of the combustion chamber 5. The region Z1 encircled by a broken line in FIG. 6 is a plug region where the tip end part 13a of the spark plug 13 is present.

The other middle injection ports 22 located on the respective sides of the inside injection ports 22a, which may referred to as outside injection ports 22b, form side sprays 2f, which may referred to as outside sprays 22bf. Above the regions where the inside sprays 22af and the outside sprays 22bf pass, two lift regions Z2 are present where the intake valves 8 ascend and descend. Accordingly, the side sprays 22f are oriented so that they do not come into contact with the intake valves 8 at their maximum lift point where the intake valves 8 descend the most.

Specifically, as shown in FIG. 5A, the injection angles Θ2, Θ2' between the line L, which passes through the respective middle injection ports 22 and is perpendicular to the axial line P of the cylinder 2, and the center lines 22as, 22bs of the inside and outside side sprays 22af, 22bf are in the range between 25 degrees and 40 degrees as viewed in the direction intersected at a right angle with the center line 21s of the upper spray 21f and the axial line P of the cylinder 2.

Under the above conditions, the side sprays 22f are formed close to each other so as not to collide with each other in the space of the combustion chamber 5. Specifically, as shown in FIG. 5B, each center line 22s of the side spays 22f is within a predetermined injection angle Θ3 as viewed in the direction of the axial line P of the cylinder 2. Specifically, the center lines 22as, 22bs are intersected with the wall surface of the peripheral wall 5b within a range of 135 degrees symmetrical with respect to the axial line P of the cylinder 2 as a center. In the present example embodiment, the injection angle Θ3 is 132 degrees between the center lines 22bs of the outermost outside sprays 22bf.

With the above configuration, all the inside and outside sprays 22af, 22b are formed in the direction of the tumble flow of the intake air as a whole while dispersing the fuel droplets. This enhances the tumble flow to promote homogeneous dispersion of the fuel-air mixture.

Further, the upper spray 21f and the side sprays 22f are intercepted by the layer of the intake air flow by the tumble flow before they reach the wall surface of the peripheral wall 5b. This may be advantageous in reducing the amount of fuel droplets adhering to the wall surface of the peripheral wall 5b.

Referring then to the lower injection port 23, it is configured to inject the fuel to the top surface 3a of the piston 3, especially, the cavity 3d recessed in the top surface 3a thereof for effectively utilizing the tumble flow.

Figure 7:
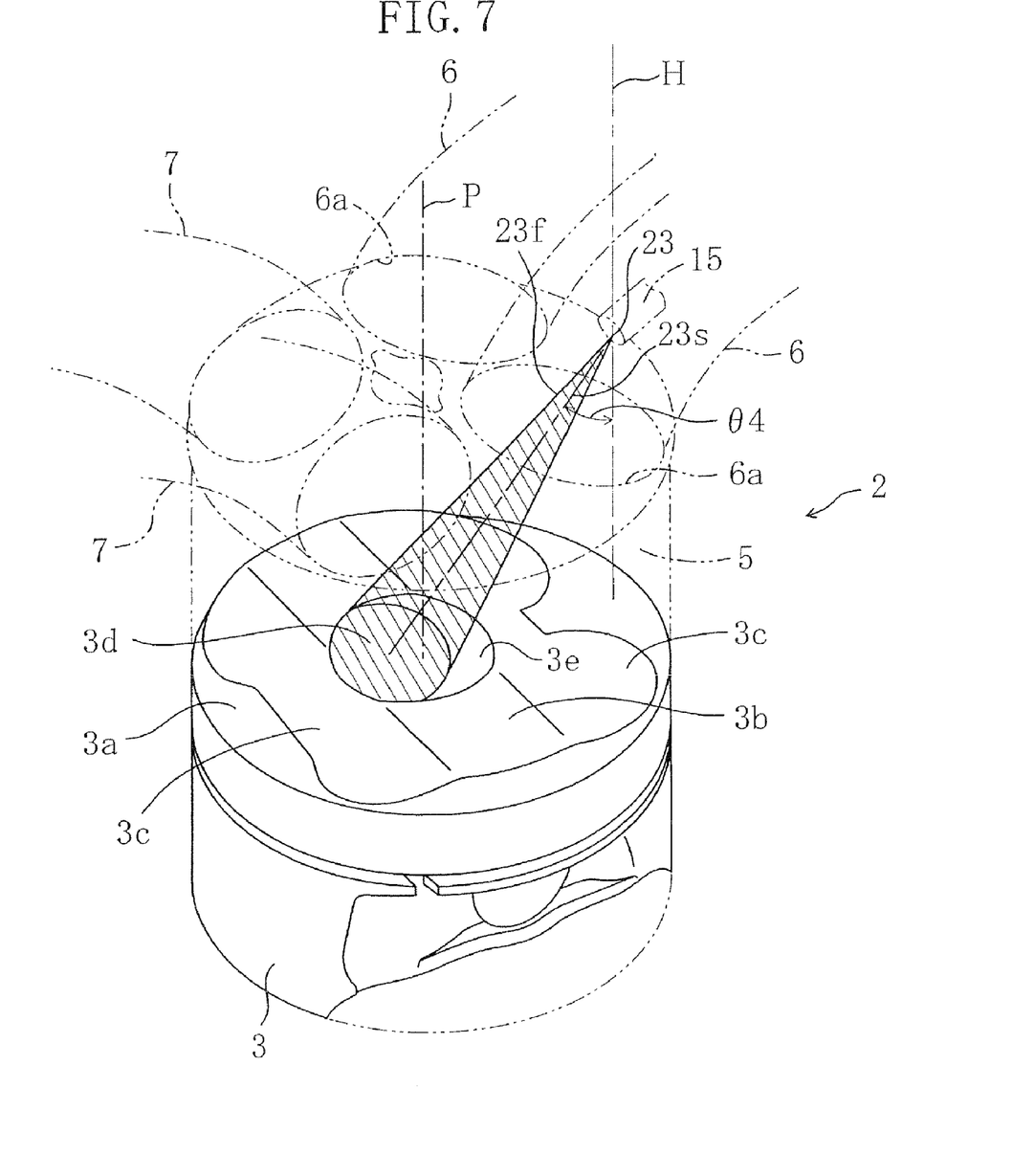
FIG. 7 is a perspective view showing the state of a lower spray.

Specifically, as shown in FIG. 7, the top surface 3a of the piston 3 includes, in a portion thereof corresponding to a portion between the intake inlets 6a and the exhaust outlets 7a of the ceiling wall 5a, a band-shaped raised surface 3b of which level is increased. On the respective sides of the raised surface 3b, gently downwardly inclined surfaces 3c are formed correspondingly to the triangular roof shape of the ceiling wall 5a of the combustion chamber 5. The cavity 3d recessed in a spherical shape is formed in a part eccentric toward the exhaust side from the substantially central part in the longitudinal direction of the raised surface 3b.

Specifically, the cavity 3d has a downwardly curved inclined surface as a peripheral surface 3e between its bottom and its outer periphery so that the colliding fuel droplets rebound toward the central part of the combustion chamber 5. The center of the cavity 3d is eccentric from the center of the top surface 3a of the piston 3 to the exhaust side.

On the basis of the experimental results, the lower spray 23f toward the cavity 3d is so set to have the center line 23s intersected at a predetermined or larger angle with the axial line P of the cylinder 2, and so set not to collide head-on with the tumble flow flowing upward on the intake side of the combustion chamber 5. Namely, as shown in FIG. 7, the lower injection port 23 is configured so that the center line 23s of the lower spray 23f forms a predetermined angle Θ4 (or a lower injection angle Θ4) equal to or larger than 35 degrees with respect to a reference line H which passes through the lower injection port 23 and is in parallel to the axial line P of the cylinder 2.

Thus, since the lower spray 23f cannot collide head-on with the tumble flow flowing upward on the intake side of the combustion chamber 5, the fuel injection cannot impair the tumble flow. Further, the fuel injection convolves the tumble flow flowing upward in the intake side, and guides it to the exhaust side from the intake side in the upper part of the combustion chamber 5. Hence, the circulation of the tumble flow is enhanced in combination with the tumble flow enhancing operation by the fuel injection from the upper injection port 21 and the middle injection ports 22, thereby further promoting homogeneous dispersion of the fuel-air mixture.

For reference, when the lower injection angle Θ4 is increased, the lower spray 23f tends to collide with the peripheral wall 5b on the exhaust side of the cylinder block 1a to cause the fuel to adhere directly to the peripheral wall 5b, thereby inviting combustion failure.

The top surface 3a of the piston 3 is moving in the cylinder 2 during fuel injection to change the collision point of the lower spray 23f with the top surface 3a of the piston 3.

In view of this moving piston 3 and fuel injection timing, the lower injection port 23 is configured so that the lower spray 23f collides with a part of the cavity 3d which ranges on the intake side from the edge on the exhaust side of the cavity 3d at the end of the fuel injection in the intake stroke.

Specifically, in the present example embodiment, the lower spray 23f collides with a part of the cavity 3d which ranges on the intake side from the edge on the exhaust side of the cavity 3d when the crank angle is 100 degrees after the top dead center in the intake stroke in which the piston 3 is in its downstroke. Whereby, effective promotion of homogeneous dispersion of the fuel-air mixture can be achieved even in the low rotation range in which the operation of the tumble flow decreases to comparatively tend to cause local dispersion.

The end of fuel injection in the present example embodiment is not limited to the above crank angle, and may be changed according to needs as long as the same advantages as above can be obtained.

Figure 8:
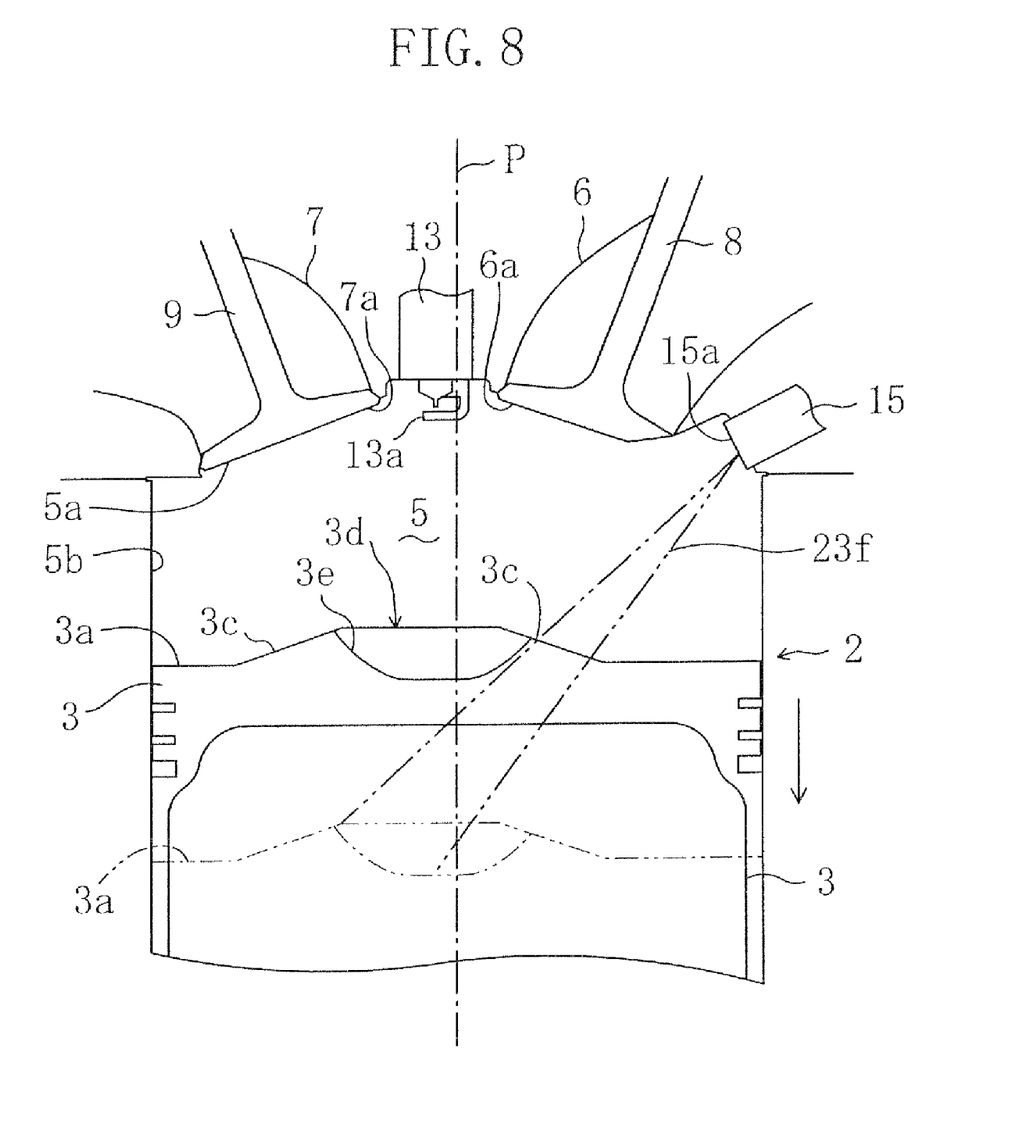
FIG. 8 is an illustration explaining the relationship between the position of a piston and the fuel injection timing of the lower spray.

Referring in detail to this point, when the piston 3 is positioned on the TDC side in the beginning of the fuel injection, the lower spray 23f collides with a part of the tope surface 3a of the piston 3 which is located on the intake side, as indicated by the solid line in FIG. 8. The top surface 3a of the piston 3 has an inclined surface 3c on the intake side, and therefore, almost all fuel droplets rebound from the inclined surface 3c toward the central part of the combustion chamber 5. By a combination with the fuel dispersion operation by the tumble flow, which is comparatively strong in the initial stage of the intake stroke, the rebounding fuel droplets can be gasified and atomized without adhering to the peripheral wall 5b.

Thereafter, when the piston 3 descends and the fuel injection ends, the part where the lower spray 23f collides with the top surface 3a shifts from the intake side toward the exhaust side, as indicated by the imaginary lines in FIG. 8, so that the lower spray 23f collides with a part on the exhaust side of the top surface 3a of the piston 3. Thus, the cavity 3d, which is eccentric to the exhaust side in the top surface 3a of the piston 3, can receive the lower spray 23f, as shown in FIG. 7.

That is, the lower spray 23f is set to collide with a part of the cavity 3d which ranges on the intake side from the edge on the exhaust side of the cavity 3d and on the exhaust side from the edge on the intake side of the cavity 3d. In other words, almost all amount of the lower spray 23f is set so that almost all part thereof collide with the cavity 3d.

Accordingly, almost all fuel droplets colliding with the spherically recessed cavity 3d rebound toward the central part of the combustion chamber 5, thereby achieving effective prevention of the fuel droplets from adhering to the peripheral wall 5b. Further, homogeneous dispersion of the fuel-air mixture can be promoted by a combination of the droplet rebounding operation and the tumble flow operation even when the tumble flow operation decreases to some extent. It is noted that the lower injection angle Θ4 in the present example embodiment is set at approximately 40 degrees.

The fuel spraying conditions of the fuel injected from each injection port 21, 22, 23, such as the lower injection angle Θ4, and the like are set on the assumption that no intake flow is present in the combustion chamber 5, and the internal pressure of the combustion chamber 5, the injection pressure, and the like are based on the use state. The spray angles of the sprays 21f, 22f, 23f from the respective injection ports 21, 22, 23 are set in the range between 10 degrees and 15 degrees (12 degrees in the present example embodiment), and at least 90% injected fuel is sprayed within the range. An example of spray angle measuring methods may be laser sheet.

As described above, the present invention can enhance the tumble flow by fuel injection to promote homogeneous dispersion of the fuel-air mixture in the combustion chamber 5, thereby achieving improvements on fuel economy and output performance and prevention of combustion failure, knocking, and the like.

The present invention is not limited to the above example embodiment, and includes other various variations and modifications. For example, the cavity 3d may be in a rectangularly recessed shape or indeterminate forms, instead of the spherical shape, as long as the colliding fuel can rebound toward the central part of the combustion chamber 5 so as not to adhere to the peripheral wall 5b. Accordingly, the inclined surface of the cavity 3d may not necessarily be formed in the entire peripheral surface, and may be formed at least part on the exhaust side.

What is claimed is:

1. An internal combustion engine of spark-ignition direct-injection type in which a fuel injection valve having a tip end part with a plurality of injection ports is configured to directly inject fuel into a combustion chamber in a cylinder, wherein
the combustion chamber includes an upper surface defined by a ceiling wall formed in a cylinder head, and a lower surface defined by a top surface of a piston,
two intake ports opened/closed by intake valves are formed in the ceiling wall for introducing intake air into the combustion chamber to provide intake flow flowing from an intake side toward an exhaust side in an upper part of the combustion chamber,
the two intake ports are arranged adjacent to each other in a peripheral part of the ceiling wall, and the injection valves between the intake ports have tip ends facing the combustion chamber,
a cavity is formed in a part of the top surface of the piston below a spark plug, and
when a crank angle is 100 degrees after the top dead center in an intake stroke, a lower spray, which is a spray from a lower injection port injecting the fuel the most downward of the plurality of injection ports, collides with a part of the top surface of the piston which ranges on the intake side from an edge on an exhaust side of the cavity.

2. The engine of claim 1, wherein
when the crank angle is 100 degrees after the top dead center in the intake stroke, the lower spray collides with a part of the top surface of the piston which ranges on the exhaust side from an edge on an intake side of the cavity.

3. The engine of claim 1, wherein
the cavity is eccentric to the exhaust side from a substantial center of the piston, and includes an inclined surface at at least part of a peripheral surface thereof.

4. The engine of claim 1, wherein
the lower spray has a center line intersected with an axial line of the cylinder, and other sprays above and adjacent to the lower spray have center lines passing on respective sides of the axial line of the cylinder.

5. The engine of claim 1, wherein
the spark plug is provided at a substantial center of the ceiling wall of the combustion chamber, and
an upper spray, which is a spray from an upper injection port injecting the fuel the most upward of the plurality of injection ports, does not come into contact with the spark plug.

6. The engine of claim 5, wherein
the upper spray from the upper injection port has a center line extending downward below a plane which passes through the upper injection port and which is perpendicular to the axial line of the cylinder.

7. The engine of claim 1, wherein
the plurality of injection ports are configured so that sprays injected therefrom do not collide with each other.

8. A fuel injecting method for directly injecting fuel in plural directions into a combustion chamber of a spark ignition internal combustion engine, comprising:
injecting the fuel into the combustion chamber from a part between two adjacent intake ports, which are formed in a peripheral part of a ceiling wall of the combustion chamber, in an intake stroke for introducing intake air to the combustion chamber from the intake ports to cause intake air to flow from an intake side toward an exhaust side in the upper part of the combustion chamber,
wherein in the injecting, at an end of fuel injection when fuel injection ends in a downstroke of a piston, a most downward lower spray collides with a part of the top surface of the piston which ranges on the intake side from the edge on the exhaust side of a cavity, the cavity being formed eccentrically to the exhaust side from the substantial center of the top surface of the piston.

9. The method of claim 8, wherein
in the injecting, the lower spray collides with a part of the top surface of the piston which ranges on the exhaust side from the edge on the intake side of the cavity at an end of the fuel injection.

* * * * *